United States Patent [19]

Ryhänen

[11] Patent Number: 5,641,911
[45] Date of Patent: *Jun. 24, 1997

[54] METHOD AND APPARATUS FOR FEEDBACK-CONTROL OF AN ASYMMETRIC DIFFERENTIAL PRESSURE TRANSDUCER

[75] Inventor: Tapani Ryhänen, Helsinki, Finland

[73] Assignee: Vaisala Oy, Helsinki, Finland

[*] Notice: The term of this patent shall not extend beyond the expiration date of Pat. No. 5,531,128.

[21] Appl. No.: 317,358

[22] Filed: Oct. 4, 1994

[30] Foreign Application Priority Data

Oct. 8, 1993 [FI] Finland .................. 934434

[51] Int. Cl.$^6$ .................................. G01L 9/00
[52] U.S. Cl. .................. 73/718; 73/715; 73/724
[58] Field of Search .............. 73/715, 718, 724, 73/862.626, 862.622, 862.623, 514.18, 514.21, 517 B

[56] References Cited

U.S. PATENT DOCUMENTS

| | | | |
|---|---|---|---|
| 4,434,664 | 3/1984 | Antomazzi | 73/718 |
| 4,831,492 | 5/1989 | Kuisma . | |
| 5,095,750 | 3/1992 | Suzuki et al. . | |
| 5,377,524 | 1/1995 | Wise et al. . | |
| 5,531,128 | 7/1996 | Ryhanen | 73/862.623 |

OTHER PUBLICATIONS

Semiconductor Capacitance-type Accelerometer with PWM Electrostatic Servo Technique, Sensors and Actuators, A21–A23, 1990, Suzuki et al., pp. 316–319.

Design and Test of a Precision Servoaccelerometer with Digital Output, The 7th International Conference on Solid–State Sensors and Actuators, Y. de Coulon et al., 1993, pp. 832–835.

Wise, Kensall D., Analog Data Acquisition Circuits In Integrated Sensing Systems, in Advances in Analogue Circuit Design, Apr. 6–8, 1993, edited by Sansen, Huijsing, and van de Plassche. Apr. 8, 1993.

*Primary Examiner*—Richard Chilcot
*Assistant Examiner*—Ronald Biegel

[57] ABSTRACT

The invention is related to a feedback method and apparatus for a capacitive differential pressure transducer. According to the method, a pressure-transducing conducting diaphragm (1) forming a first, moving electrode of the transducer capacitances is kept in a force balance state by means of a pulse train signal applied to a fixed electrode (2, 3). According to the invention, the diaphragm (1) is kept stationary in a geometrically constant state and a desired electric potential is applied to the diaphragm (1), the pulse train signal is applied to at least two of the fixed electrodes (2, 3), or alternatively, sets of fixed subelectrodes. The signals applied to separate electrodes (2, 3) or sets of subelectrodes are at opposite polarities referenced to the electric potential of the pressure-transducing diaphragm (1) for at least a portion of the measurement duration, and are of equal amplitude at least for each pair of electrodes (2, 3). The same pulse train signal is simultaneously used for both establishing the force balance and performing the capacitance measurement. Changes in the dielectric coefficient of the transducer fill medium are compensated for by altering the pulse amplitude, pulse width or pulse rate depending on the primary modulation method used in the feedback control.

15 Claims, 8 Drawing Sheets

METHOD AND APPARATUS FOR FEEDBACK-CONTROL OF AN ASYMMETRIC DIFFERENTIAL PRESSURE TRANSDUCER

BACKGROUND OF THE INVENTION

The invention is related to a feedback-control method for an asymmetric differential pressure transducer.

The invention also concerns an apparatus for the feedback-control of an asymmetric differential pressure transducer.

A micromechanical element kept at a given electric potential can be controlled by an electrostatic force which is generated by means of potential differences applied to the electrodes surrounding the element and the element itself. As known, the electrostatic force generated between two electrodes is expressed as:

$$F_{electric} = \int_A \frac{\epsilon_0 \epsilon_r U^2 dA}{2d^2} \quad (1)$$

where $U$ is the potential difference between planar electrodes, $\epsilon_r$, dielectric coefficient of the medium, $dA$ elementary area element and $d$ distance between the planar electrodes. The integration is carried out over the electrode surface. On the basis of Eq. (1), the electrostatic force between the electrodes can be interpreted as an electrostatic pressure acting on the electrode surface:

$$P_{electric} = \frac{dF_{electric}}{dA} = \frac{\epsilon_0 \epsilon_r U^2}{2d^2} \quad (2)$$

Next, a differential pressure transducer structure is examined comprising a body structure supporting a fixed electrode and a diaphragm attached at its edges to said body structure and adapted to deflect under an imposed differential pressure. If the deflection of the diaphragm remains extremely small, each surface element of the diaphragm will be subjected to an equally large force effect by both the electrostatic pressure expressed by Eq. (2) and the externally applied physical pressure, which is thus cancelled by the electrostatic pressure at any point of the diaphragm surface, that is, $p_{ext} = p_{electric}$. This means that a differential pressure transducer can be operated as a servotransducer in an electrically feedback-connected mode. When the diaphragm is controlled to the nondeflected state, the external pressure can be expressed as:

$$p_{ext} = \frac{Q^2}{2\epsilon_0 \epsilon_r A^2} \quad (3)$$

where $Q$ is the charge on the electrodes.

Such a feedback arrangement is, however, handicapped by three basic problems:

1) The relationship between the electrostatic pressure and the feedback control voltage employed as the transducer output voltage is nonlinear on the basis of Eq. (2).
2) The equation $p_{ext} = \epsilon_0 \epsilon_r U^2/2d^2$ is valid in a force balance state only when the diaphragm deflection is zero. To identify this state, the diaphragm position must be known.
3) The factor linking the feedback voltage to the generated electrostatic pressure is dependent on the dielectric coefficient of the medium between the electrodes.

A solution to these problems is disclosed in U.S. Pat. No. 5,095,750 to Suzuki et al., "Semiconductor Capacitance-Type Accelerometer with PWM Electrostatic Servo Technique", by S. Suzuki, S. Tuchitani, K. Sato, S. Ueno, Y. Yokota, M. Sato and M. Esashi, Sensors and Actuators A21-A23, pp. 316–319, 1990 and Design and Test of a Precision Servoaccelerometer with Digital Output, by Y. de Coulon, T. Smith, J. Herman, M. Chevroulet and F. Rudolf, The Proceedings of the 7th International Conference on Solid-State Sensors and Actuators, Yokohama, Japan 1993, pp. 832–835. If the feedback arrangement is implemented using a pulse-width or pulse-rate modulated signal, i.e., with a constant-amplitude pulse (voltage level), a linear relationship can be established between the electrostatic pressure and the duty cycle of the pulse train:

$$P_{electric} = \frac{\epsilon_0 \epsilon_r U_{pulse}^2}{2d^2} \cdot D \quad (4)$$

where $D = T_{ON}/T_{total}$, that is, the ratio of the pulse ON time to the total pulse period. Eq. (4) may be further written as:

$$P_{electric} = \frac{\epsilon_0 \epsilon_r}{2d^2} \cdot U_{pulse}^2 \cdot T_{pulse} \cdot f_{pulse} \quad (5)$$

where $U_{pulse}$ is the amplitude of the pulse train, $T_{pulse}$ is the pulse width and $f_{pulse} = n/T_{total}$ is the pulse rate (pulses/unit time). In conjunction with pulse-width modulation, a linear output voltage is obtained by taking the pulse train output signal via an integrator. A pulse-rate modulated signal can be directly processed as a digital signal formed by a bit stream. A problem of the pulsed feedback-control scheme is that the pulse train signal fed back as the control signal acts as an AC signal that may affect the capacitance measurement and even saturate the measurement circuits employed in the capacitance measurement.

A starting point for the design of a pulsed feedback control of an acceleration transducer is to operate appreciably above the transducer natural frequency (see U.S. Pat. 5,095,750 and the two articles referred to above) whereby the transducer seismic mass by its moment of inertia is not capable of exhibiting a fast response to individual pulses, and thus, the pulsed feedback force effect is averaged. By contrast, in a differential pressure transducer the diaphragm natural frequency is significantly higher (typically in the order of 30–200 kHz depending on the diaphragm thickness and diameter). However, when operated at atmospheric pressure, the diaphragm is subjected to extremely heavy viscose damping, so again the diaphragm is prevented from responding to individual pulses imposed at a high pulse rate, and also here the pulsed feedback force effect is averaged.

In capacitive measurement techniques, particularly when employing the force balance principle, a problem arises from the dependence of the dielectric coefficient on the temperature, humidity and other factors affecting the dielectric fill medium of the transducer. Therefore, the dielectric coefficient must be measured and its changes compensated for. Such a method is disclosed in U.S. Pat. No. 4,831,492 to Kusima according to which the actual transducing electrode of a pressure transducer is surrounded by another electrode having a low sensitivity to pressure change thus being suited for detecting changes in the dielectric coefficient.

SUMMARY OF THE INVENTION

It is an object of the present invention to overcome the drawbacks of the above-described techniques and to achieve a novel measurement method and apparatus suited for use in conjunction with an asymmetric capacitive differential pressure transducer based on the force balance principle.

The invention is based on keeping the transducing diaphragm of an asymmetric pressure transducer in a controlled manner in a constant position by means of a pulsed feedback signal, and by virtue of applying the feedback signal in opposite phases to a split fixed electrode which is divided in two parts to this end, both the difference and sum values of the transducing capacitances can be obtained from which a correction term can further be computed for the change of the dielectric coefficient.

The invention offers significant benefits.

The greatest problem in an electrostatically feedback-controlled micromechanical transducer is the dependence of the capacitor gap fill medium on temperature and humidity. Particularly in oil-filled transducers a temperature change causes a change in the dielectric coefficient of the fill medium, and thus, an error in pressure measurement. The apparatus according to the invention overcomes such an error source. Another significant benefit is that the electrostatic force effect exerted by the capacitance sensing signal is utilized in the feedback arrangement, and thus, the pulsed feedback signal cannot saturate the capacitance measurement circuits. The apparatus according to the invention makes it possible to implement a measurement apparatus that is, besides the differential pressure measurement, also capable of measuring such a quantity as humidity or temperature, for instance, which has a particular relationship with the dielectric coefficient.

Further benefits of the apparatus according to invention are: a linear output signal related to the pressure differential either as a pulse-rate signal or an analog signal, and a small temperature dependence.

BRIEF DESCRIPTION OF THE DRAWINGS

In the following, the invention will be examined in more detail by means of exemplifying embodiments with reference to the attached drawings, in which:

FIG. 1b is a more detailed view of an alternative embodiment of the measurement circuit block of the diagram illustrated in FIG. 1a;

FIG. 2b is a simplified block diagram of an alternative operating mode of the measurement apparatus illustrated in FIG. 2a;

DETAILED DESCRIPTION OF THE PREFERRED EMBODIMENTS

An optimal control of a pressure-transducing diaphragm can be implemented by a suitable design of the electrode geometry. Such a measurement method is based on keeping the pressure-transducing diaphragm in a nondeflected state. This desirable arrangement is implemented by means of capacitance measurement and electrostatic feedback so that the error signal taken to the control circuit from the measurement circuit is proportional to the capacitance difference between the capacitances formed by the equal-area inner and outer fixed electrodes with the diaphragm electrode, and particularly the error signal is zero when said capacitances are equal. The benefits of the method include a minimized temperature dependence of the transducer and a controlled nonlinearity error. However, a problem to overcome arises therefrom that the AC measurement signal which is used for sensing the capacitances causes an electrostatic force between the diaphragm and the fixed electrode.

Figure 1A:
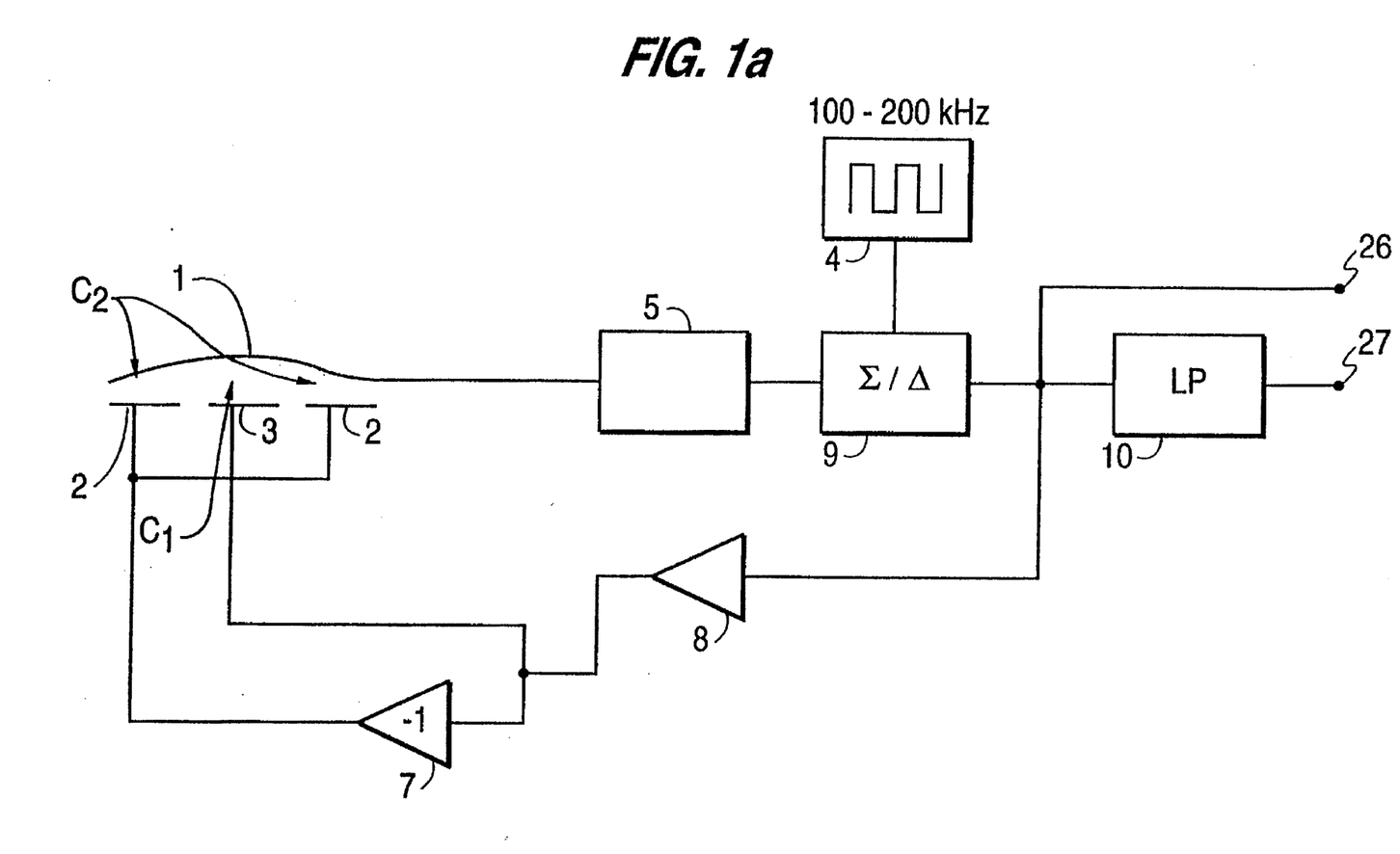
FIG. 1a is a simplified block diagram of a measurement apparatus according to the invention.

With reference to FIG. 1a, when a pulse-width or pulse-rate modulated signal is used for the feedback-control of a unidirectionally-measuring asymmetrical differential pressure transducer, the pulse train employed in the feedback-control of the diaphragm position can also be used for sensing the diaphragm position. The combination feedback/sensing system is based on a pressure-transducing conducting diaphragm 1 and a support structure carrying two fixed, concentric electrodes 2 and 3. The feedback signal is taken in pulsed form to the fixed electrodes 2 and 3 so that the voltages applied to the fixed center electrode 3 and the fixed outer electrode 2 are in opposite phases referenced to the potential of the diaphragm 1. Then the potential swing induced at the diaphragm 1 by the feedback signal is zero when the two capacitances formed by the inner fixed electrode 3 and the outer fixed electrode 2 with the electrode of the diaphragm 1 are equal. By contrast, the electrostatic forces acting between the diaphragm 1 and the fixed electrodes 2 and 3 are attractive due to the quadratic relationship $F \propto U^2$. The pressure-transducing diaphragm 1 whose deflection in the diagram is exaggerated for greater clarity is controlled by opposed fixed electrodes 2 and 3. The fixed electrodes 2 and 3 are concentric and essentially equal in their effective areas. The pressure-transducing diaphragm 1 and the electrode 3 comprise the capacitor $C_1$, while the diaphragm 1 and the electrode 2 comprise the capacitor $C_2$, respectively. Next to the charge amplifier 5 along the signal path is a $\Sigma/\Delta$ converter 9 clocked by a clock frequency 4. The clock frequency is advantageously in the range of 50–300 kHz. The output of the $\Sigma/\Delta$ converter 9 provides directly a pulse rate output signal 26, which simultaneously is the desired pressure difference signal. By filtering the pulse rate output signal with the help of a low-pass filter 10, an analog measurement signal is obtained from the analog output 27. The amplitude of the pulse rate signal used as the feedback-control signal is modulated by means of a pulse-amplitude modulator 8, from whose output the feedback signal is taken to the electrodes 3 and 2, however, first inverting the signal taken to the electrode 2 by means of an inverter 7. Instead of the charge amplifier 5, other kinds of capacitance measurement arrangements can also be employed. Furthermore, the $\Sigma/\Delta$ converter can be replaced by any circuit suited for converting a DC signal into a pulsed signal. Moreover, the inverter 7 may be replaced by any means capable of providing two pulse train signals with opposite polarities referenced to the electric potential of the diaphragm 1.

The embodiment disclosed herein has the benefit that the electrostatic force effect exerted by the measurement signal is utilized in the feedback arrangement and that the pulse-form feedback signal is prevented from causing saturation of the capacitance measurement circuits.

Figure 1B:
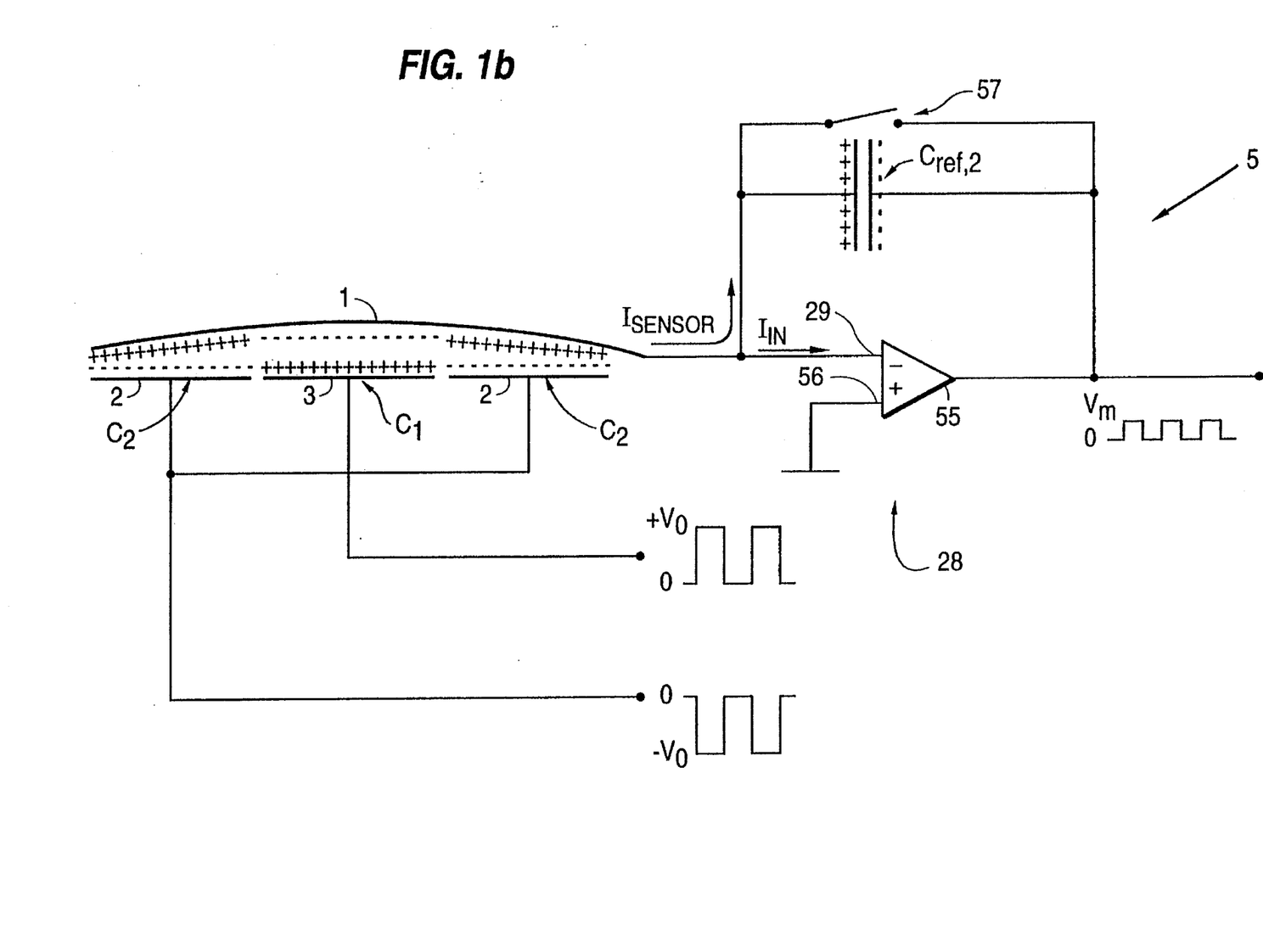

With reference to FIG. 1b, an exemplifying embodiment according to the invention is described for the capacitance difference detection method employed in the capacitance bridge as a special case of the general principle illustrated in FIG. 1a. The embodiment is constructed around a charge amplifier 5 suited for implementing the transfer function required in the measurement system disclosed herein. The capacitor $C_1$ is fed with a positive-polarity pulse train $+V_0$ referenced to the ground potential, and correspondingly, the capacitor $C_2$ is fed with a negative-polarity pulse train $-V_0$. Thus, the signals applied to the two fixed electrodes 2 and 3 are at inverted polarities with regard to the ground potential. The conducting transducing diaphragm 1 is connected to the inverting input 29 of an operational amplifier 28. The operational amplifier output 55 is feedback-connected to the inverting input 29 of the operational amplifier 28 via a capacitor $C_{ref,\,2}$. Then, the potential of the transducing diaphragm 1 is determined by the potential of the noninverting input 56 of the operational amplifier 28, which potential in the illustrated case is the ground potential. This arrangement fulfills the condition that the diaphragm 1 must be kept at a constant potential. If the two capacitances $C_1$ and $C_2$ of the transducer are equal, a change in the potential of the fixed electrodes 2 and 3 causes only a charge change on the moving transducing diaphragm 1 without any externally detectable potential change. By contrast, if the capacitances $C_1$ and $C_2$ are unequal, a charge transfer from the feedback capacitor $C_{ref,\,2}$ will occur to the transducing diaphragm 1, or alternatively, vice versa. Then, the operational amplifier output voltage will be:

$$V_m = -\frac{C_1 - C_2}{C_{ref2}} \cdot V_0$$

where $V_0$ is the pulse amplitude. This transfer function wall be ideally realized only for an ideal operational amplifier. In practice, the input current $I_{in}$ of the operational amplifier 28 will load the transducer. However, the input current $I_{in}$ can be reduced to a relatively insignificant level by using a MOSFET front stage. A switch 57 connected in parallel with the feedback capacitor $C_{ref2}$ permits discharging (resetting) of the charge of the capacitor $C_{ref2}$. If the capacitor $C_{ref2}$ is discharged during each pulse period when the electrodes 1, 2 and 3 are at the ground potential, the desired transfer function can be realized at frequencies above 10 kHz in a relatively ideal manner. The situation can be further improved by adapting a hold circuit or an integrator subsequent to the charge amplifier 5 for storing the output signal level.

Figure 2A:
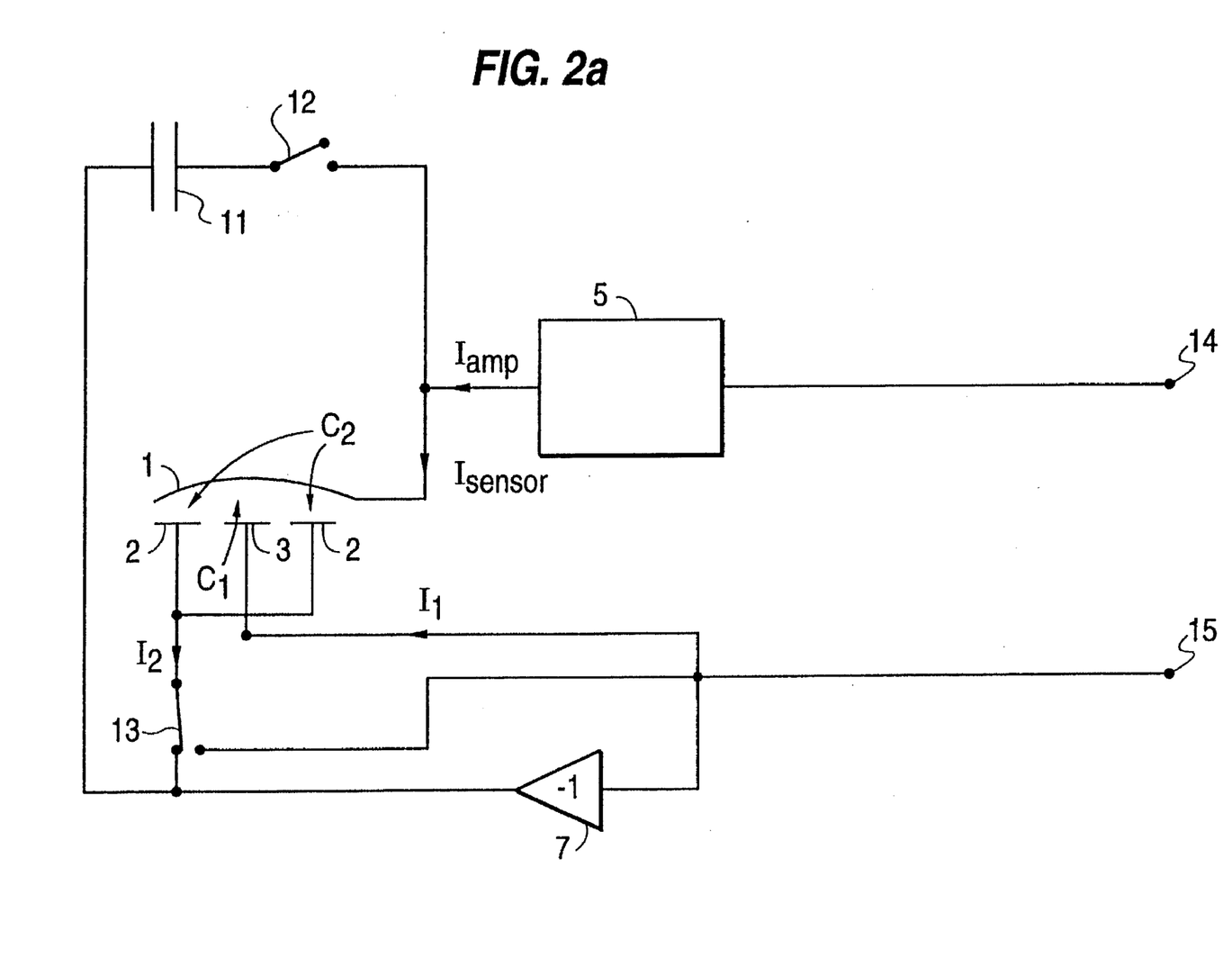
FIG. 2a is a simplified block diagram of another embodiment of a measurement apparatus according to the invention which is suited for the feedback-control of the diaphragm of a differential pressure transducer with a simultaneous facility of measuring both the sum and difference of the sensing capacitances.

In the embodiment shown in FIG. 2a, a switch 13 is employed to provide a possibility of switching an in-phase feedback signal to both electrodes 2 and 3 via the terminal 15. As the switch 13 permits the parallel connection of the electrodes 2 and 3, the charge amplifier 5 can be used for measuring the difference of the sum capacitance $C_1+C_2$ and the reference capacitance $C_{ref}$, whereby the signal at the output 14 of the charge amplifier 5 is proportional to said difference. However, in the case illustrated in the diagram, the electrodes 2 and 3 are taken to opposite polarities with regard to the potential of the diaphragm 1, whereby the switch 12 is in the open position. Hence: $I_{amp}=I_{sensor}$. Moreover, when using the definitions given in the description of FIG. 2a, the electrode currents fulfill the following condition: $I_1-I_2+I_{sensor}=0$. When $C_1=C_2$, the electrode currents are equal, that is, $I_1=I_2$, and $I_{sensor}=0$.

Figure 2B:
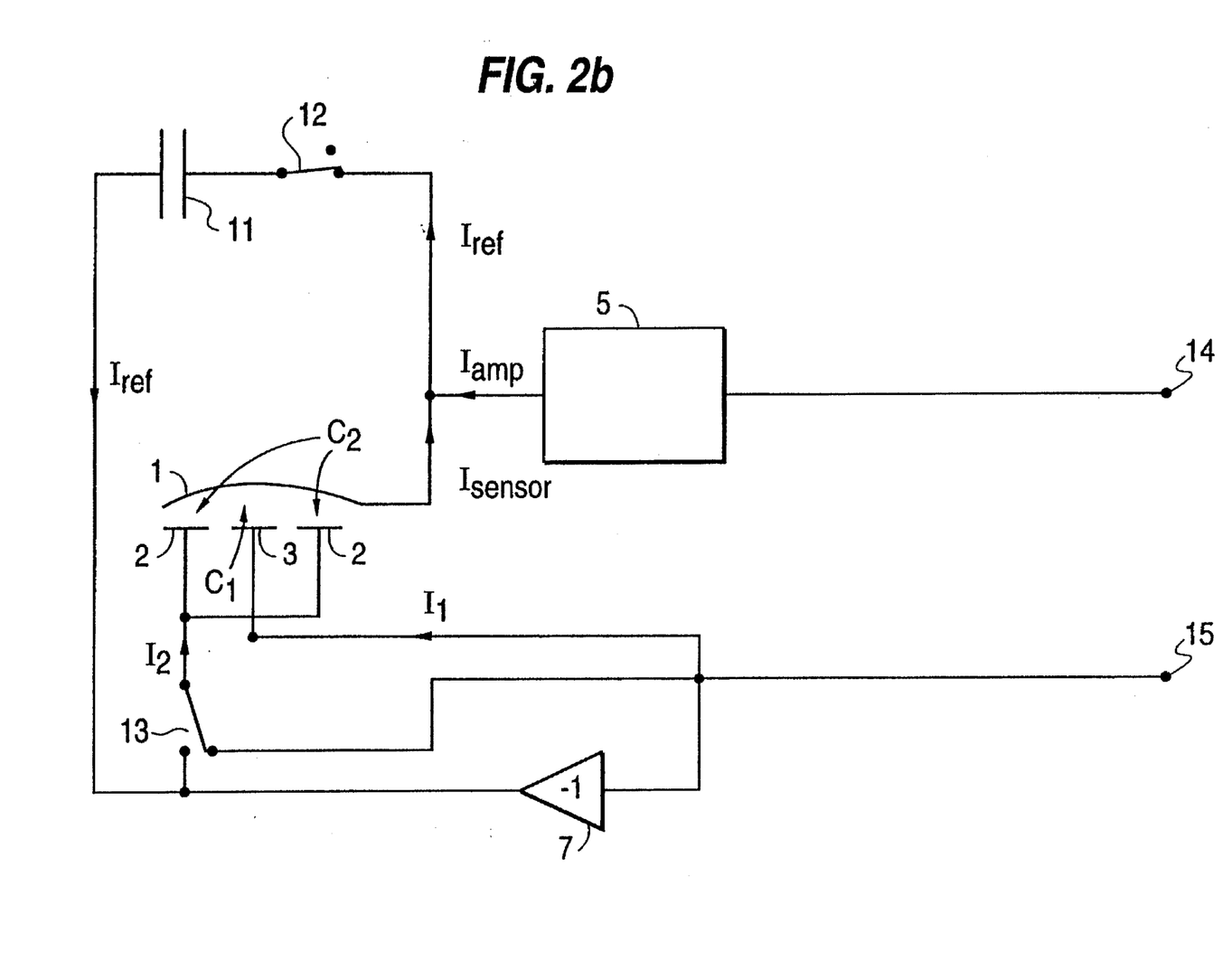

In the operating mode shown in FIG. 2b, the switch 13 is set to a position in which the same signal is applied to the electrodes 2 and 3. Additionally, the switch 12 is in the closed position. Hence: $I_{amp}-I_{ref}+I_{sensor}=0$. Moreover, if $C_1+C_2 = C_{ref}$, the currents are: $I_{ref}=I_{sensor}$ and $I_{amp}=0$. Thus, in the case illustrated herein, the pulse signal is applied in-phase to the electrodes 2, 3 of the transducer 1, while the same signal is applied out-of-phase to the reference capacitor 11, with regard to the electric potential of the diaphragm 1, respectively.

Figure 3:
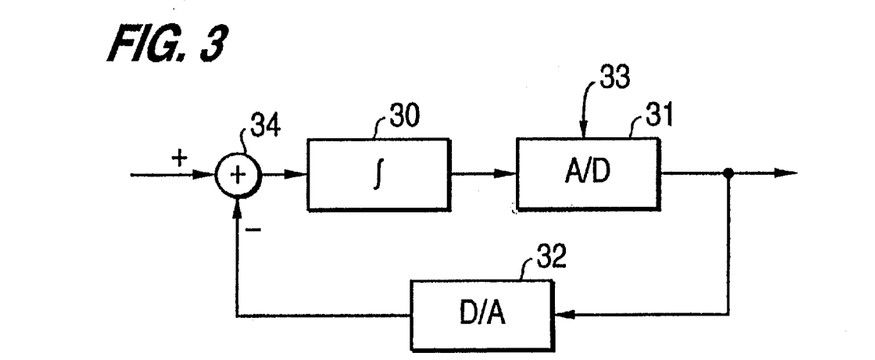
FIG. 3 is :a block diagram of a first-order $\Sigma/\Delta$ converter employed in conjunction with the invention.

With reference to FIG. 3, a $\Sigma/\Delta$ converter is shown suited for converting a DC signal into a pulsed signal. The signal to be converted is taken to the quantizer 33 of the converter via an integrator 30, and the quantized output is feedback-connected to an adder 34, where it is subtracted from the input signal to the adder. Such a feedback arrangement 32 forces the average value of the quantized signal to follow the average value of the input signal to the converter. The difference of these signals is accumulated in the integrator, thus implementing self-correction. A basic characteristic of the above-described converter circuit is its simplicity: the $\Sigma/\Delta$ converter comprises an integrator 30, a 1-bit A/D converter 31 and a feedback branch via a 1-bit D/A converter 32. The A/D converter 31 can be realized with the help of, e.g., a limiter (not shown) and a D-flip-flop circuit (not shown) so that D-flip-flop circuit is driven by an external clock frequency 33. The D/A converter 32 can be implemented with the help of, e.g., an analog switch driven by a D-flip-flop circuit. The external clock frequency 33 determines the pulse width. The clock frequency 33 is selected so that the signal frequency remains significantly smaller than the clock frequency 33, whereby oversampling is realized. The ratio of the oversampling rate to the signal frequency must be in the order of 100 or higher when a second-order $\Sigma/\Delta$ converter is used. Then, the quantization noise remains insignificant.

Figure 4:
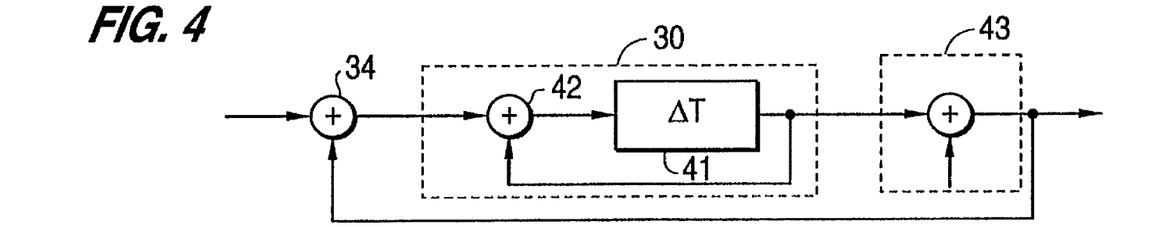
FIG. 4 is an equivalent circuit of the first-order $\Sigma/\Delta$ converter illustrated in FIG. 3.

With reference to FIG. 4, an integrator 30 comprises a summing point 42 and a delay circuit 41 whose output is feedback-connected to the summing point 42. The delay circuit is followed by a quantizing block 43 which corresponds to the A/D converter 31 described above. The input signal is taken to the quantizing block 43 via the integrator 30. The quantized output signal is feedback-connected to the input side and subtracted there from the input signal to the circuit. The feedback arrangement forces the quantized signal to follow the average level of the input signal to the circuit. The difference between the average level of the input signal and the digitized output signal is stored in the integrator 30 thus resultingly performing self-correction. If the signal quantization circuit is designed for a binary level output signal, the quantized output signal toggles between two states so that its moving average corresponds to the average level of the input signal.

Figure 5:
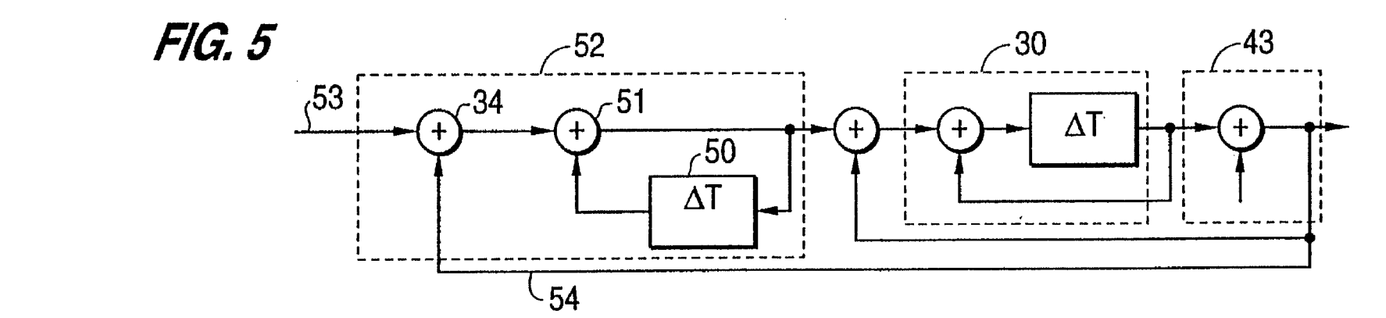
FIG. 5 is an equivalent circuit of a second-order $\Sigma/\Delta$ converter suited for use in conjunction with the invention.

With reference to FIG. 5, a second-order $\Sigma/\Delta$ converter includes besides the circuitry shown in FIG. 4, a loop comprising a summing point 51 and a delay circuit 50, whereby said loop together with the adder 34 represents the pressure transducer 52 itself. Namely, the inertia of the differential pressure transducer 52 makes it act as an integrator. The feedback arrangement 54 represents the electrostatic pressure and the input 53 stands for the external differential pressure signal.

When the above-described method is employed in which the geometric position of the diaphragm is known (e.g., the nondeflected state) and such a state is kept unchanged, any change in the capacitance is caused by changes in the dielectric coefficient. Then, the value of the dielectric coefficient can be determined through capacitance measurement. In a transducer structure with the metallic fixed electrode divided in two separate electrodes, the geometrically constant state of the diaphragm can be upheld irrespective of changes in the dielectric coefficient. Shortly, when the difference of the capacitances is zero, the sum of the capacitances can only take place due to a change in the dielectric coefficient. Therefore, the dielectric coefficient can be determined through the measurement of the sum of the capacitances, and the measurement result can be used for the compensation of the differential pressure error caused by a change in the dielectric coefficient.

In pulse-width and pulse-rate modulated feedback arrangements, the change in the dielectric coefficient can be compensated for by modulating the pulse amplitude of the feedback signal. According to Eqs. (1), (2) and (4), the amplitude of the feedback signal pulses must be $$U_{pulse} = \frac{U^{(0)}_{pulse}}{\sqrt{1 + \frac{\Delta\epsilon_r}{\epsilon_r^{(0)}}}}$$

where $U^{(0)}_{pulse}$ the feedback voltage amplitude when $\epsilon_r = \epsilon_r^{(0)}$.

In the pulse-rate modulation scheme, the compensation of the change in the dielectric coefficient can also be implemented by means of pulse-width modulation of the feedback signal. This is implemented according to Eq. (5) as $$T_{pulse} = \frac{T^{(0)}_{pulse}}{1 + \frac{\Delta\epsilon_r}{\epsilon_r^{(0)}}}$$

where $T^{(0)}_{pulse}$ is the pulse width in the feedback signal pulse train when $\epsilon_r = \epsilon_r^{(0)}$. A benefit with respect to the implementation based on compensation by virtue of pulse-amplitude modulation is herein the linearity achievable by means of the latter method. Analogously, in the pulse-width modulation the pulse rate can be varied for compensation as $$f_{pulse} = \frac{f^{(0)}_{pulse}}{1 + \frac{\Delta\epsilon_r}{\epsilon_r^{(0)}}}$$

where $f^{(0)}_{pulse}$ is the pulse rate of feedback signal pulse train when $\epsilon_r = \epsilon_r^{(0)}$.

Figure 6:
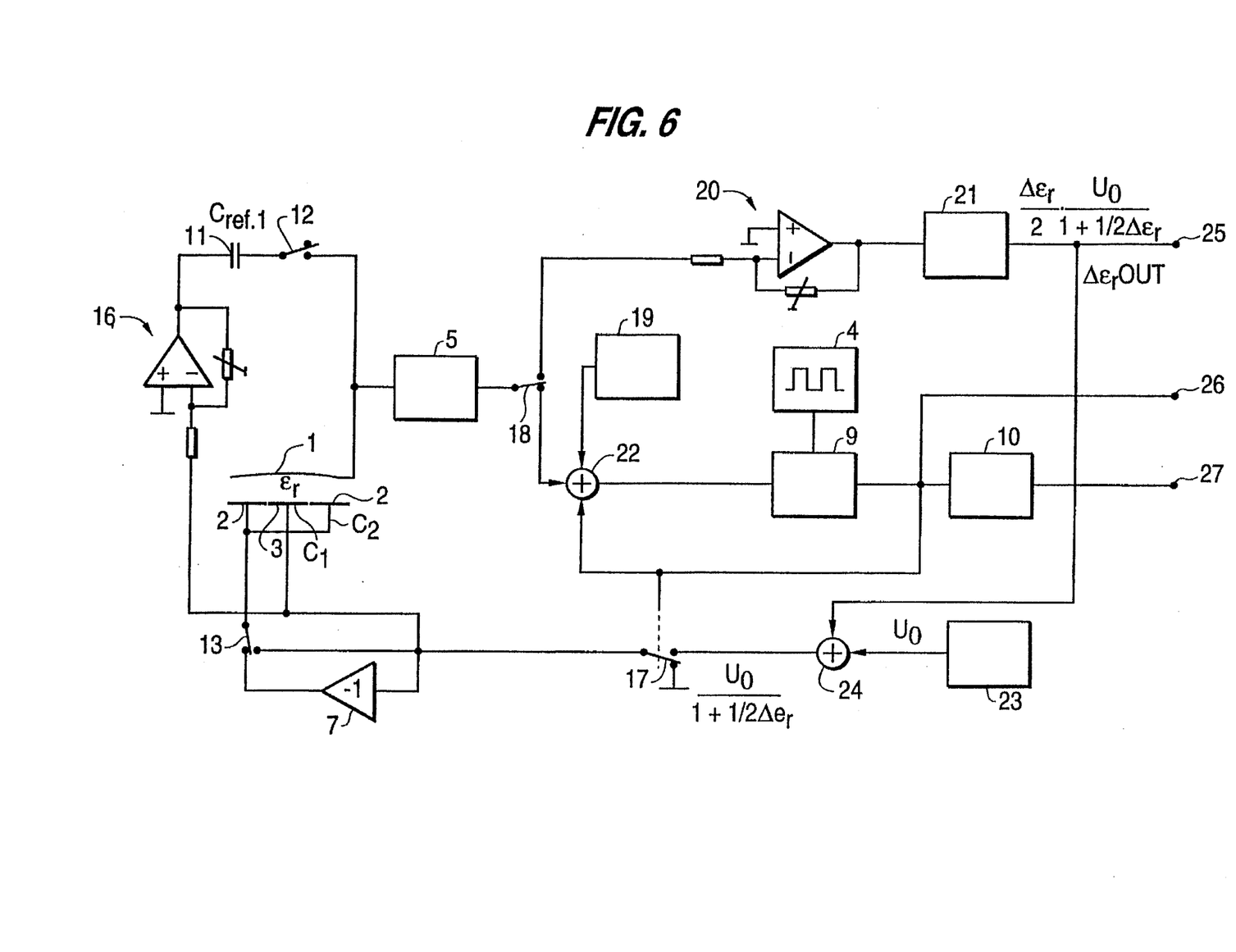
FIG. 6 is a more detailed and comprehensive block diagram of the measurement apparatus illustrated in FIG. 2.

With reference to FIG. 6, a block diagram is shown for a total system, in which the feedback arrangement is implemented by means of a pulse signal feedback configuration in which the change in the dielectric coefficient is sensed via highly accurate capacitance measurement and in which the error caused by the dielectric coefficient change in the differential pressure measurement is compensated for by modulating the pulse amplitude. The following complementary description discusses only such elements which were omitted from the diagrams of FIGS. 1 and 2.

The dielectric coefficient change is compensated for in the measurement circuit using a linear approximation:

$$\sqrt{1 + \frac{\Delta\epsilon_r}{\epsilon_r^{(0)}}} \approx 1 + 1/2 \frac{\Delta\epsilon_r}{\epsilon_r^{(0)}}$$

The amplitude of feedback signal pulse train is controlled by means of an amplifier 16 so that the capacitance $C_{ref}$ of the reference capacitor 11 becomes effectively equal to the sum $C_1+C_2$ of the transducer capacitances. This means that the amplifier gain must be set to value $(C_1+C_2)/C_{ref}$. Then, the pulse train current signal passing via the reference capacitor $C_{ref}$ becomes equal to the pulse train current signal passing via the parallel-connected transducer capacitances $C_1+C_2$. Said gain value is not essential to the spirit of the invention, while definitely the most practical. By virtue of the switch 12, the reference capacitor 11 can be connected on and off in parallel with the measurement circuit capacitances.

The switch 18 operates synchronized to the switches 12 and 13 and the circuit 21. The desired measurement mode is selected by the switch 18.

The gain A of the feedback loop is controlled by means of the amplifier 20 so that the desired compensation of the dielectric coefficient change is realized.

The summing amplifier 24 closes the control loop for the amplitude control of the feedback pulse train signal. The control loop design rules are as follows:

given the output voltage of the capacitance measurement block 5:

$$U_m = \frac{C_1 + C_2 - C_{ref}}{C_{ref2}} \cdot U_0 = \frac{C - C_{ref}}{C_{ref2}} \cdot U_0$$

where $C = C^{(0)} + \Delta\epsilon_r C^{(0)}$ and $C^{(0)}$ is the measured capacitance at the calibration instant (e.g., when $\epsilon_r = \epsilon_r^{(0)}$). Then:

The summing amplifier 24 implements the formula:

$$U'_0 = A \cdot U_m + U_0 = \frac{U_0}{1 - A \cdot \frac{C - C_{ref}}{C_{ref2}}}$$

A change in the pulse amplitude compensates for a change in the dielectric coefficient if the following condition is fulfilled:

$$U'_0 = \frac{U_0}{\sqrt{1 + \frac{\Delta\epsilon_r}{\epsilon_r^{(0)}}}} = \frac{U_0}{1 + 1/2 \frac{\Delta\epsilon_r}{\epsilon_r^{(0)}}} \ ; kun \ \Delta\epsilon_r << \epsilon_r^{(0)}$$

By selecting $C_{ref} = C^{(0)}$ or adjusting the gain of the amplifier 16 so that this condition is effectively attained, that is, the ratio of the pulse amplitudes becomes equal to $C_{ref}/C^{(0)}$, and controlling the gain of the amplifier 20 so that $A = -C_{ref2}/2C^{(0)}$, the necessary pulse amplitude condition for the compensation of the dielectric coefficient change $\Delta\epsilon_r$ will be fulfilled.

The pulse amplitude controlling voltage is stored in circuit 21 for the duration of the capacitance difference measurement. The output 25 of the hold circuit 21 provides a voltage proportional to the dielectric coefficient value.

The displacement position of the diaphragm 1 can be controlled by means of the offset control voltage taken to the offset control circuit 19. In other words, the diaphragm 1 can be deviated as required from its neutral position in which $C_1 = C_2$. Thus, the offset control voltage permits the selection of the applied external differential pressure at which the output pulse train signal has zero pulse rate. Consequently, the circuit 19 provides the adjustment of the system zero point.

The base setting of the pulse amplitude is implemented by means of circuit 23. This circuit determines the relationship of the output signal pulse rate with the differential pressure applied to the transducer. Alternatively, this adjustment can be called transducer sensitivity calibration. The output voltage of the circuit 23 is summed to the compensation voltage in summing point 24.

Figure 7:
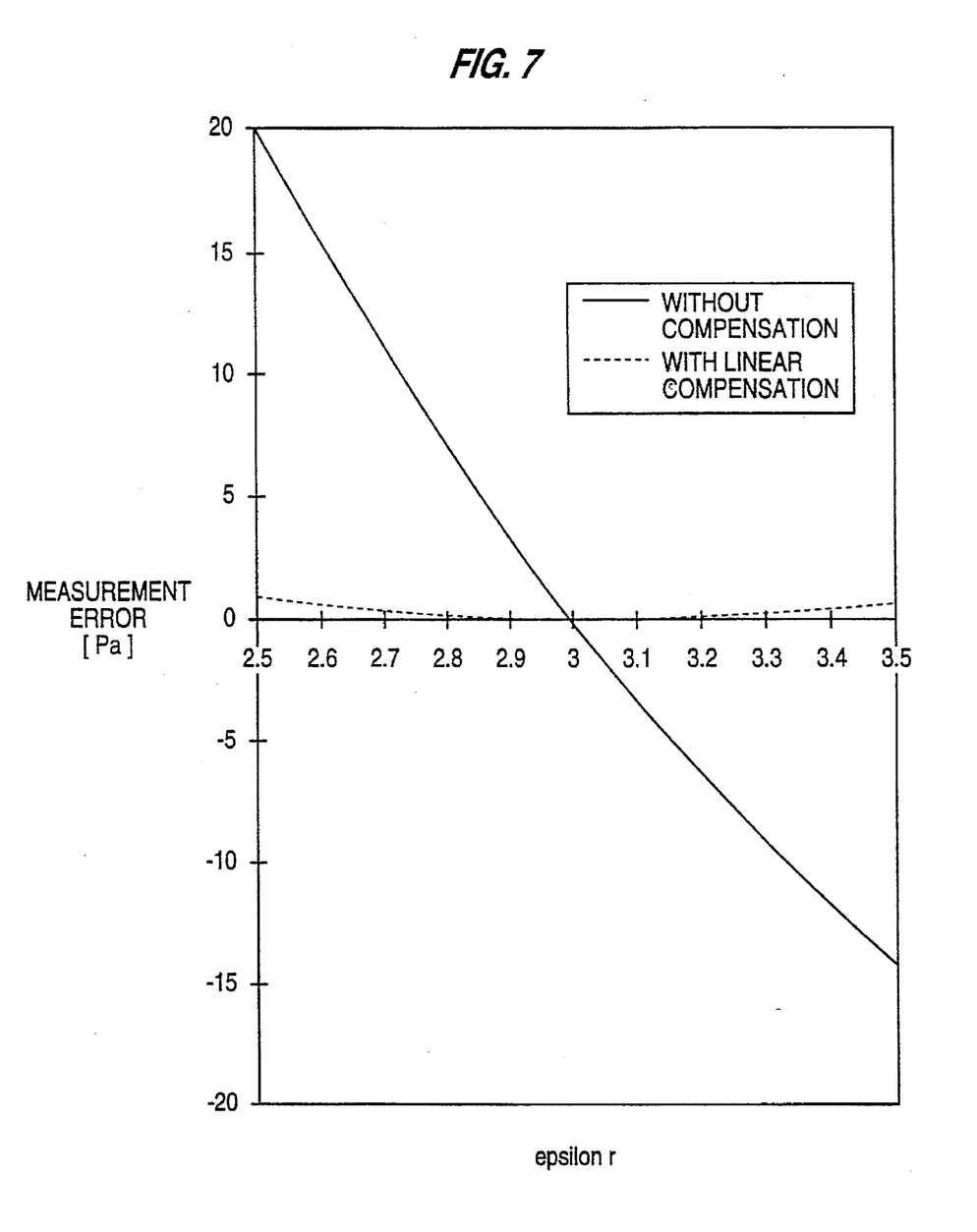
FIG. 7 is a graph illustrating the measurement error as a function of the dielectric coefficient without and with the compensation scheme according to the invention.

With reference to FIG. 7, it can be seen that without the use of compensation, a change of the dielectric coefficient from 3 at which the measurement system is calibrated to 2.5 causes a 20 Pa error in transducer output signal. Correspondingly, an opposite change of the dielectric coefficient to 3.5 causes an approx. 15 Pa error in the transducer output signal. The applied external differential pressure in the illustrated case was 100 Pa and capacitor gap dimension was d=1 μm.

Figure 8:
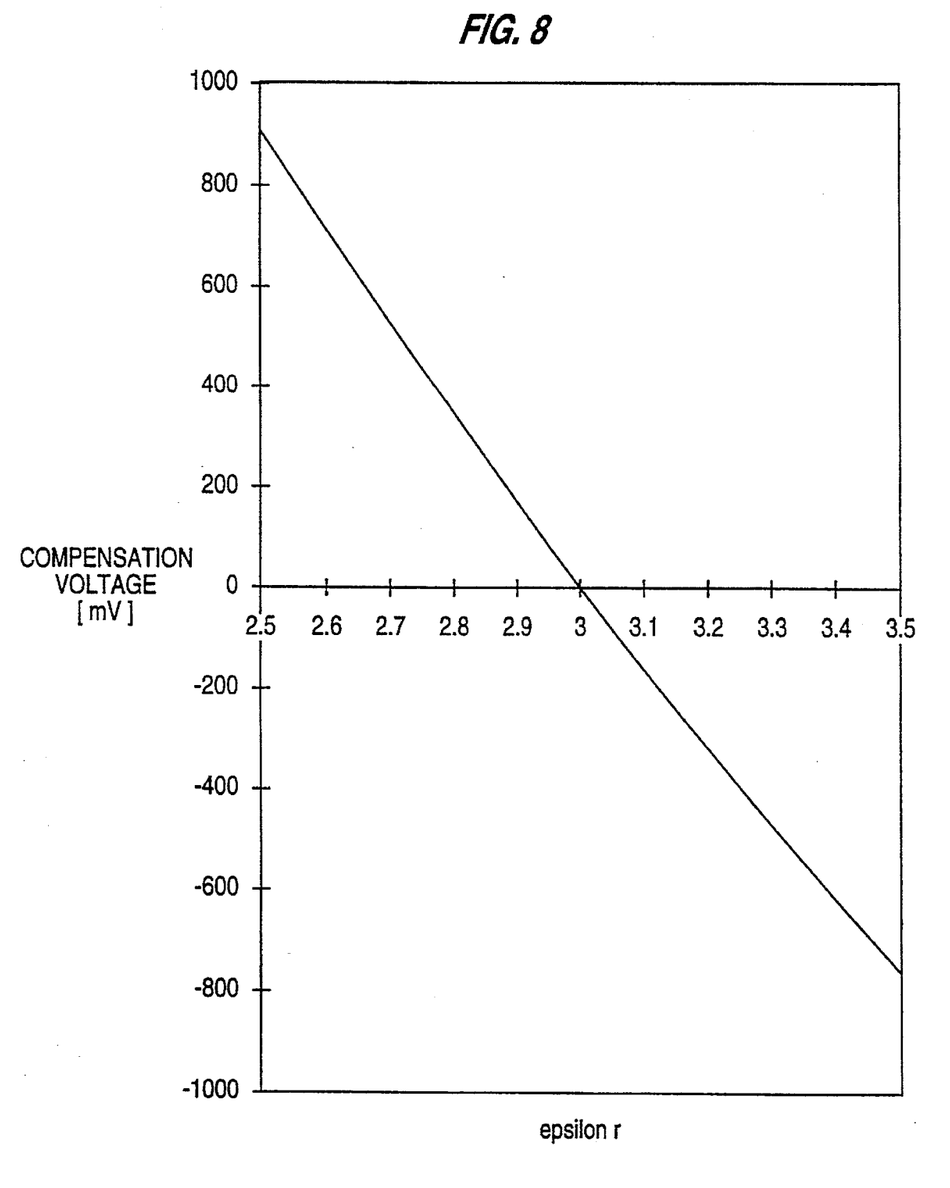
FIG. 8 is a graph illustrating the required compensation voltage as a function of the dielectric coefficient in the method according to the invention.

With reference to FIG. 8, it can be seen that in the case illustrated in FIG. 7 the compensation voltage corresponding to the value 2.5 of the dielectric coefficient is approx. 900 mV, and correspondingly for the value 3.5 of the dielectric coefficient, approx. −700 mV. The voltage plotted in the diagram is available at output 25 of circuit configuration illustrated in FIG. 6.

The properties of the embodiment according to the invention are summarized as:

- Besides having a simple configuration, the system is also straightforward to calibrate. Calibration takes place by altering the pulse amplitude and summing the desired offset voltage at the integrator input of the Σ/Δ converter, whereby the first adjustment alters the response function slope and the latter the zero point. Both adjustments are independent from each other.
- The feedback control of the diaphragm position in a unidirectionally measuring differential pressure transducer is implemented by means of a pulse-rate modulated signal so that same pulse train signal both establishes the electrostatic feedback force and measures the difference and sum of the capacitances $C_1$ and $C_2$.
- The pulse amplitude can be controlled accurately by means of gain control of, e.g., the amplifier 21.
- The adjustments of the pulse amplitude base height (amplifier 20) and the integrator offset (offset control circuit 19) allow the system to be timed to a desired operating point according to the transducer pressure measurement range.
- The circuit operation is based on two measurement cycles (determined by switch 13), wherein using the charge amplifier 5 the first cycle measures the difference of the capacitances $C_1$ and $C_2$ and the second cycle measures the sum of the capacitances $C_1$ and $C_2$.
- The rate of the feedback pulse train signal during both measurement cycles is controlled to achieve an electrostatic force that keeps the transducer diaphragm in a desired constant state (e.g., nondeflected).
- During the difference measurement of capacitances $C_1$ and $C_2$, the pulse train is applied to the inner and outer fixed electrodes at opposite polarities (inverter 7).
- During the sum measurement of the capacitances $C_1$ and $C_2$, the pulse train is applied to the outer and inner fixed electrodes at the same polarity.
- The capacitance measurement output signal is adjusted so that the output signal pulse amplitude is of the form:

$$U_0/(1+\tfrac{1}{2}\Delta\epsilon_r/\epsilon_r^{(0)})$$

whereby the differential pressure range and resolution can be adjusted through controlling the pulse amplitude (circuit 23).
- The center point of the differential pressure range can be adjusted by adjusting the offset of the integrator of the Σ/Δ converter 9.
- The pulse train signal is formed by means of a switch 17 controlled by the circuit 9.

The method according to the invention may also be applied to the measurement of the dielectric coefficient. Further, by inserting a dielectric film responsive to. e.g., humidity, the capacitance change caused by the dielectric coefficient change can be utilized to measure the change of such an external variable.

It is an object of the invention to keep the transducing diaphragm in a desired geometric shape irrespective of imposed differential pressure level or change in the dielectric coefficient. However, the above-described exemplifying embodiment achieving the desired goal by virtue of applying the feedback control signal to the two fixed electrodes 2 and 3 at opposite phases relative to the conducting diaphragm 1 is not by any means the only solution according to the spirit of the invention. Alternatively, the desired charge balance viz. controlled deviation from the balance and corresponding balance of electrostatic forces in the measurement capacitors can be implemented using a desired even number of the fixed electrodes. Namely, an even number of fixed electrodes permits a relaxed selection of control voltage pulse train amplitudes provided that the charge and electrostatic force balance conditions discussed above are fulfilled.

In accordance with the above-described control arrangements, a term effective area may be defined for the fixed electrodes 2 and 3 of the transducer structure. The electronic circuit measuring the capacitance difference of two capacitances $C_1$ and $C_2$ can be assumed to have a transfer function of the form $\alpha C_1 - \beta C_2$, where the coefficients $\alpha$ and $\beta$ are determined by the configuration of the measurement circuit and the capacitor gap distances. If the capacitances $C_1$ and $C_2$ are directly proportional to the areas $A_1$ and $A_2$ of the capacitors, the effective areas of the capacitors can be defined as $\alpha A_1$ and $\beta A_2$. Then, the dual-zone capacitor structures are brought to a state of equal effective areas when the following condition is fulfilled:

$$\alpha C_1 - \beta C_2 = 0.$$

I claim:

1. A feedback-control method for an asymmetric capacitive differential pressure transducer having a deflectable pressure sensitive electrically conductive diaphragm, forming a first electrode of the capacitive transducer kept in a force balance state using a pulse train signal applied to fixed electrodes of the transducer, the fixed electrodes lying on one side of the pressure sensitive diaphragm, the method comprising the steps of:

keeping the deflected pressure sensitive diaphragm stationary in a fixed geometric state of deflection and applying a fixed electric potential to the pressure sensitive diaphragm;

applying the pulse train signal to at least two of the fixed electrodes or alternatively, to at least two sets of fixed subelectrodes, the pulse train signals applied to separate ones of the at least two fixed electrodes or to separate sets of the at least two sets of subelectrodes having opposite polarities with respect to the fixed electric potential applied to the pressure sensitive diaphragm, and further wherein the pulse train signals applied to said separate fixed electrodes or to said separate sets of subelectrodes are of equal amplitude at least for each pair of said at least two electrodes or of said at least two sets of subelectrodes;

changing a duty cycle of the pulse train signal so as to control a geometric state of deflection of the pressure sensitive diaphragm; and measuring, based upon a duty cycle of the pulse train signal, a difference in capacitance between capacitances respectively formed between the pressure sensitive diaphragm and said at least two fixed electrodes, or formed between the pressure sensitive diaphragm and said at least two sets of fixed subelectrodes, such that the same pulse train signal is simultaneously used for controlling the geometric state of deflection of the pressure sensitive diaphragm and for performing the capacitance measurement.

2. A method as defined in claim 1, wherein the step of measuring the capacitance between the pressure sensitive diaphragm and the fixed electrodes or subelectrodes is performed in two cyclically alternating phases comprising:
    (a) measuring the difference between two transducing capacitances in the first phase, and
    (b) measuring the sum of two transducing capacitances in the second phase, each of the transducing capacitances being a capacitance between the pressure sensitive diaphragm and a respective fixed electrode or set of subelectrodes.

3. A method as defined in claim 2, wherein the difference of the two transducing capacitances is kept constant by means of a feedback arrangement, whereby the geometric state of the deflectable pressure sensitive diaphragm of the transducer is kept unchanged and the sum of the two transducing capacitances is used for computing changes in the dielectric coefficient of the transducer fill medium.

4. A method as defined in claim 1, wherein the fixed electric potential applied to the deflectable pressure sensitive diaphragm is ground potential, and further wherein the pulse train signals applied to the separate fixed electrodes or subelectrodes are of opposite polarity with regard to the ground potential.

5. A method as defined in claim 1, wherein the pulse train signal is a pulse-rate modulated square wave signal, and further including the step of altering the pulse amplitude or pulse rate of the square wave signal to compensate for a measured change of the dielectric coefficient of the transducer fill medium.

6. A method as defined in claim 1, wherein the pulse train signal is a pulse-width modulated square wave signal and further including the step of altering the pulse amplitude or pulse rate of the square wave signal to compensate for a measured change of the dielectric coefficient of the transducer fill medium.

7. A method as defined in claim 1, wherein the pulse train signal is a pulse-amplitude modulated square wave signal, and further including the step of altering the pulse width or pulse rate of the square wave signal to compensate for a measured change of the dielectric coefficient of the transducer fill medium.

8. A method as defined in claim 1, wherein the pulse train signal is applied to the pressure sensitive diaphragm via a reference capacitor such that the pulse train signal is supplied to the two fixed electrodes or subelectrodes of the transducer at the same polarity, and to the reference capacitor at an opposite polarity with respect to the electrode potential applied to the transducing diaphragm of the transducer.

9. An apparatus for feedback-control of an asymmetric capacitive differential pressure transducer, said apparatus comprising:
    a pressure sensitive conducting diaphragm forming a first electrode of a transducing capacitor to be measured;
    at least one fixed electrode in the vicinity of said pressure sensitive diaphragm, the at least one fixed electrode acting as the second electrode of the transducing capacitor to be measured;
    capacitance measurement means for determining the capacitance of the transducing capacitor to be measured; and
    a feedback apparatus for feedback-controlling the transducing capacitor via an electric pulse train signal employed to implement a force balance principle, wherein
    said at least one fixed electrode includes at least two subelectrodes located concentrically, and
    said feedback apparatus includes means for generating at least two pulse train signals of opposite polarity with respect to the electric potential of the pressure sensitive diaphragm, said pulse train signals being fed to at least two of the subelectrodes.

10. An apparatus as defined in claim 9, wherein said feedback apparatus further includes a switch for alternately switching at least one of the subelectrodes to receive respectively inverted and noninverted ones of said pulse train signals of opposite polarity.

11. An apparatus as defined in claim 10, further including a reference capacitor electrically connected to the pressure sensitive conducting diaphragm of the transducer, and a second switch for switching the reference capacitor into and out from the measurement circuit.

12. An apparatus as defined in claim 9, wherein said subelectrodes have essentially equal effective areas.

13. An apparatus as defined in claim 11, wherein the capacitance of the reference capacitor and the sum capacitance formed between the fixed subelectrodes and the pressure sensitive transducing diaphragm, respectively, are essentially equal.

14. An apparatus for feedback-control of an asymmetric capacitive differential pressure transducer, said apparatus comprising:
    a pressure sensitive conducting diaphragm forming a first electrode of a transducing capacitor to be measured;
    at least one fixed electrode in the vicinity of said pressure sensitive diaphragm, the at least one fixed electrode acting as the second electrode of the transducing capacitor to be measured;
    capacitance measurement means for determining the capacitance of the transducing capacitor to be measured; and
    a feedback apparatus for feedback-controlling the transducing capacitor via an electric pulse train signal employed to implement a force balance principle, said feedback apparatus changing a duty cycle of the pulse train signal so as to control electrostatic forces in the transducing capacitor, wherein
    said at least one fixed electrode includes at least two subelectrodes located concentrically, and
    said feedback apparatus includes means for generating, from the electric pulse train signal, at least two pulse train signals of opposite polarity with respect to the electric potential of the pressure sensitive diaphragm, said pulse train signals being fed to at least two of the subelectrodes.

15. An apparatus as defined in claim 14, wherein said feedback apparatus further includes a switch for alternately switching at least one of the subelectrodes to receive respectively inverted and noninverted ones of said pulse train signals of opposite polarity.

* * * * *